Patented June 8, 1948

2,442,989

UNITED STATES PATENT OFFICE 2,442,989

ANION EXCHANGE RESINS

Sidney Sussman, Moorestown, N. J., assignor to The Permutit Company, New York, N. Y., a corporation of Delaware No Drawing. Application June 16, 1942,
Serial No. 447,275

13 Claims. (Cl. 210—24)

This invention relates to water insoluble resin products particularly adapted for use as anion exchangers, to the preparation of such products and to the treatment of liquids with such products for effecting anion exchange reactions.

The preparation of anion exchange resins by reaction of an acid salt of a polyalkylene-polyamine with an aldehyde and a very large proportion of a ketone has been proposed, but is difficult to carry out on a large scale and is disadvantageous in several respects. For instance, such a process requires the use of special complicated apparatus that is resistant to corrosion by acidic solutions. Continuous heating is necessary and after a gel is formed, this has to be removed from a closed vessel. Also, the acid used to form the amine salt not only makes the reaction difficult to carry out on a large scale, but has to be neutralized with alkali before the product is ready for its first run as an anion exchanger.

I have found that excellent products may be prepared by the direct condensation of a polyalkylene-polyamine with an aldehyde and a ketone or other substance containing labile hydrogens, thereby avoiding the difficulties of an acidic reaction mass. Such a process saves the cost of using acid to neutralize the amine; of the alkali needed to neutralize the acid in the final product, and at the same time makes it possible to prepare the resins in open vessels under well controlled conditions without extensive heating.

One object of this invention is the provision of improved methods of preparing such resins under carefully controlled conditions which do not require extensive heating or the use of expensive or complicated apparatus.

A further object of this invention is the provision of anion exchange resins prepared by reaction of a polyalkylene polyamine, an aldehyde and a substance containing at least two labile hydrogen atoms capable of reacting with formaldehyde to form methylol compounds.

A further object of this invention is the provision of products prepared by reaction of a polyalkylene polyamine, a ketone, nitroalkane or similar substance, and a saccharide, or a substance that hydrolyzes readily to form a saccharide.

Another object is the preparation of resins by reacting a polyalkylene polyamine with a preliminary condensation product of an aldehyde and a substance containing at least two labile hydrogen atoms capable of reacting with formaldehyde to form methylol compounds.

A further object of this invention is the preparation of a resin of the foregoing type which is specially heat treated to improve the physical properties of the product and render it less soluble in acid solutions.

A further object of this invention is the provision of a controlled process of decrepitation of the dried resins to produce a product having a regulated grain size that is not subject to substantial re-decrepitation.

In accordance with my invention, the free polyalkylene polyamine is simply mixed with the other ingredients in suitable proportions to form a gel. Extensive heating is unnecessary since the reaction is exothermic. In fact, under most conditions, it is desirable to cool the mixture in order to control the temperature. This procedure has many obvious advantages over any process requiring the use of reflux equipment.

Less expensive equipment can be used when the reaction mixture is not acid because of the elimination of the corrosion problem to a large extent. In addition, I have found that the process of gelation can be controlled much better by this procedure; and since the gel can be formed in an open vessel, it is much easier to handle on a large scale.

The condensation may be carried out with cooling at a relatively low temperature, or at higher temperatures up to the boiling point of the reacting mass. In fact, higher condensation temperatures tend to produce resins of higher density so that it may be advantageous to reflux the ingredients if a high density is needed.

The various polyalkylene polyamines that may be used include triethylene tetramine, tetraethylene pentamine and the like. The amines containing four or more nitrogen atoms are preferred. Likewise, the various common aldehydes such as formaldehyde, acetaldehyde, furfural or paraformaldehyde may be employed, or the mono- or polysaccharides such as glucose or sucrose can be substituted for all or a portion of the simpler aldehydes.

Any of the ketones such as acetone, cyclohexanone, methyl cyclohexanone, mesityl-oxide, or any other suitable ketone having reactive hydrogen atoms available for reaction with the aldehyde may be used. I have also found that other compounds with at least two labile hydrogen atoms capable of reacting with formaldehyde to form methylol compounds can be used to good advantage in place of the ketone. Such other compounds include the nitroalkanes, such as nitromethane, nitroethane or the like, which provide a resin product with nitro groups that can be reduced to amino groups, thus increasing the anion exchange capacity of the product. Acetaldehyde and crotonaldehyde are other examples of materials that may be substituted for all or part of the ketone.

The proportions of the ingredients may be varied substantially although for the best results, I prefer to use from 0.7 to 5 mols of amine for each mol of ketone or equivalent substance. A mol ratio of 1:1 or 2:1 is satisfactory under most conditions. The amount of aldehyde usually should be sufficient to provide at least two mols of aldehyde for each mol of ketone or equivalent compound. These proportions have been found to produce excellent yields of high capacity resin.

The ingredients can be mixed together in any order and still produce satisfactory resinous products. However, I have found that some advantage may be obtained if the ketone or equivalent material is allowed to react with the aldehyde to some extent before the amine is added. The pre-condensation of these ingredients probably forms a mixture of methylol compounds which products in turn react with the amine to form the desired resin.

This pre-condensation procedure can be carried out readily by mixing the ketone, nitroalkane or similar substance with the aldehyde in solution and adding a small proportion of any suitable base or other alkaline material. A small amount of the amine can be used as an alkaline catalyst, if desired, or various amines other than those used for forming the resin itself may be employed. Other suitable alkaline catalysts include the carbonates of sodium or potassium, caustic soda or potash, ammonia, lime, etc. In fact, practically any alkali that is sufficiently soluble is suitable as a catalyst.

The time of pre-condensation, which may be carried out conveniently at room temperature, will usually vary inversely with the amount of alkaline catalyst that is added. Of course, if higher temperatures are employed, the precondensation period may be correspondingly shortened. In general, this pre-condensation period may take from 1 hour or even less to 48 hours, depending upon the particular conditions and particular reagents employed. Excessively long pre-condensation periods do not appear to give as satisfactory resins as are obtained with shorter reaction periods. If the amine used in the final condensation reaction is employed as the alkaline catalyst, the amount can be varied widely from say 1 to 50%, or even more of the total quantity of amine to be employed.

Direct mixing of the reactants, whether precondensation is used or not, results in the formation of a viscous solution during the mixing period and gelation may take place practically as soon as the last of the reactants are added. In order to obtain a more uniform mixing and to permit better control of the reaction, I have found that dilution of one or more of the reactant liquids before the final mixing takes place, provides better uniformity and better control of temperature and time of gelation without adversely affecting the properties of the final resin. Any suitable solvent may be used as the diluent, although from the cost point of view, water is preferable. If desired, however, other solvents such as the lower alcohols may be employed. Dilution of the amine before reaction is particularly useful in this connection since these amines ordinarily dissolve in water with the evolution of heat. Consequently, if an amine solution is first prepared and then cooled, it is much easier to control the temperature of the reaction when this diluted amine solution is added to the other reactants.

In the use of a granular resin product as an anion exchanger, a quantity of the material is normally placed in the vessel in the form of a porous bed through which the water or other liquid to be treated can be percolated. This bed is then subjected to regeneration with a suitable alkaline solution from time to time and, of course, may be rinsed and backwashed between these stages, so that the physical properties of the product are quite important. It is desirable to have a product that is physically strong, resistant to abrasion, relatively insoluble in dilute acids and dilute alkalies and that is not brittle or otherwise subject to physical deterioration in use.

I have found that if resin gels of the polyalkylene polyamine-aldehyde-ketone type are dried by heating for a time at a temperature below 100° C., such as in the range of 60–90° C. and then are given a final heat treatment at a temperature above 90° C. and preferably above 100° C., a product is obtained which has a greater resistance to solution in dilute acids and which is harder, more resistant to abrasion and otherwise has greatly improved physical properties compared with products dried by other procedures.

If the resin is dried entirely at a temperature of 100° C. or above, or if it is heated to such a temperature too quickly, the product is apt to become spongy and filled with small bubbles. On the other hand, if it is dried entirely at a temperature below 100° C., it is apt to be much softer and more soluble in acid solutions than a product dried by the multi-stage heating method outlined above.

The first stage of heat treatment removes moisture from the product and the second stage of heating apparently produces some chemical change in the product. The time of this second heating stage will depend on the temperature employed, longer times up to 40 or even 60 hours being required at temperatures of 100° C. or slightly below 100° C. in order to obtain substantial improvement of the product. Temperatures that are too high apparently produce some decomposition and, consequently, I prefer to carry out this heating entirely below 250° C.

Resins of the type described herein will decrepitate when placed in water, and this action may be used as a means of breaking the product up to a useful size. Contrary to decrepitation experience with many gels, these resin products actually form smaller particles in low temperature water than in high temperature water. Thus, by using warm water and control of the water temperature, the decrepitation of this product may be easily controlled to produce the desired final grain size. In addition, the decrepitation of the product is exothermic, so that it is desirable to provide some cooling means for controlling the water temperature or to use a controlled flow of water during the decrepitation treatment.

If these decrepitated granular resins are dried, they again decrepitate when placed in water. Such a procedure, of course, might result in undesirable reduction of particle size, and I have found that this re-decrepitation can be minimized or largely prevented by first subjecting the resin to the action of steam before it is moistened with water. The use of very hot water also helps to minimize re-decrepitation.

To further illustrate the features of my invention, the following examples of the preparation of resins are given, although it is to be understood that the invention is not limited to the details of procedure contained in these examples:

*Example I.*—Ninety-seven parts of 37% formaldehyde solution were mixed with 11.6 parts of acetone. The solution was cooled in a water bath while 55 parts of tetraethylene pentamine were added. The reaction developed a considerable amount of heat and gelation occurred as the last of the amine was added. The gel was broken up and dried for 24 hours at 60° C. and for 24 hours at 100° C. The resulting tough brown resin was washed free of excess alkali. This resin had an acid removal capacity of 885 milliequivalents per liter. Twenty-three parts of dry resin were obtained.

*Example II.*—One hundred and twenty-nine parts of 37% formaldehyde solution were mixed with 15.5 parts of acetone and 2 parts of triethylene tetramine. After standing for 24 hours, 63 parts of triethylene tetramine were added at a rate sufficient to keep the solution temperature at 50–55° C. Gelation occurred as the last of the amine was added. The gel was dried at 60° for 24 hours, broken up, and dried at 100° for five days. After washing, the resin had an acid removal capacity of 420 milliequivalents per liter. Twenty-six parts of dry resin were obtained.

*Example III.*—To a mixture of 51 parts tetraethylene pentamine, 15.5 parts of acetone, and 100 parts of water, 54 parts of 37% formaldehyde solution was added. Gelation took place as the last of the formaldehyde solution was added. The gel was dried at 70° C. for 17 hours, 100° C. for 13 hours, and 140° C. for 116 hours. After breaking up and washing, the resin had an acid removal capacity of 450 milliequivalents per liter.

*Example IV.*—To 97 parts of 37% formaldehyde solution were added 38 parts of tetraethylene pentamine while cooling. 11.6 parts of acetone were added to this solution. The mixture was warmed for ½ hour on a steam bath to bring about gelation. The gel was broken up, dried at 65° C. for 24 hours, and dried at 100° C. for 48 hours. The resulting resin, after washing, had an acid removal capacity of 575 milliequivalents per liter. Forty-four parts of dry resin were obtained.

*Example V.*—129 parts of 37% formaldehyde solution, 15.5 parts of acetone, and 2 parts of tetraethylene pentamine were mixed and allowed to stand for 24 hours, the amine acting as an alkaline catalyst. 73 parts of tetraethylene pentamine were then added at a rate sufficient to maintain the solution temperature at 50° C. Gelation occurred as the last of the amine was added. The gel was dried at 60° C. for 24 hours, broken up, and dried at 100° C. for 72 hours. After washing and drying, the yield was 75.8% of a resin having an acid removal capacity of 995 milliequivalents per liter.

In another experiment, the same amounts of reactants were mixed in the same order but without the 24 hour standing period. Gelation occurred as the last of the amine was added. The gel was dried at 60° C. for 24 hours, broken up, and dried at 100° C. for 24 hours. After washing and drying, the yield was 38.1% of a resin having an acid removal capacity of 745 milliequivalents per liter.

*Example VI.*—129 parts of 37% formaldehyde solution were mixed with 15.5 parts of acetone and 2 parts of anhydrous potassium carbonate added as a catalyst. This mixture was stirred until the solid was in solution and then allowed to stand at room temperature for 24 hours. 68 parts of tetraethylene pentamine were added at a rate such that the solution was kept at 50° C. Gelation occurred as the last of the amine was added. The resulting gel was dried at 60° C. for 24 hours and at 100° C. for 72 hours. After crushing and washing, the resin had an acid removal capacity of 725 milliequivalents per liter. 96 parts of dry resin were obtained.

*Example VII.*—129 parts of 37% formaldehyde solution, 15.5 parts of acetone, and 2 parts of tetraethylene pentamine were mixed and allowed to stand for 24 hours. The solution was then diluted with 120 parts of water and 66.5 parts of tetraethylene pentamine were added. Gelation did not occur until more than three hours later. The gel was dried at 65° C. for 24 hours and at 100° C. for 66 hours. After breaking up and washing, the resin had an acid removal capacity of 660 milliequivalents per liter. The yield was 68 parts of dry resin.

*Example VIII.*—48 parts of 37% formaldehyde solution, 9.2 parts of nitromethane, and 2 parts of tetraethylene pentamine were mixed. After standing for 24 hours, 21 parts of tetraethylene pentamine were added at 40–45° C. Gelation occurred in about 15 minutes. The gel was dried at 60° C. for 24 hours and at 100° C. for 24 hours. After crushing and washing, the resin had an acid removal capacity of 495 milliequivalents per liter. The yield was 34 parts of dry resin.

*Example IX.*—A solution of 119 parts of glucose dissolved in 90 parts of water was prepared. 5.8 parts of acetone and then 27.4 parts of tetraethylene pentamine were added successively to this solution, and the mixture was warmed on a steam bath for several hours. 50 parts of water and 50 parts of concentrated hydrochloric acid were then added and the reacting mixture was warmed on a steam bath until gelation occurred. The gel was dried at 60° C. for 96 hours and was then crushed and washed. The yield was 36.8 parts of resin having an acid removal capacity of about 348 milliequivalents per liter.

*Example X.*—57 parts of furfural and 5.8 parts of acetone were dissolved in 30 parts of water and an equal volume of methanol. This solution was maintained at a temperature of 20–30° C. and 28.5 parts of tetraethylenepentamine were added slowly. The gel thus formed was dried and kept over night in an oven at 100° C. The resultant hard resin was crushed to a suitable size, washed with dilute acid, and regenerated. The yield was 55 parts of the resin which had an acid removal capacity of 272 me./l.

*Example XI.*—49 parts of a 37% formaldehyde solution were mixed with 8.8 parts of acetaldehyde in a cooled vessel. 19 parts of tetraethylenepentamine were added to this solution while it was maintained at a temperature below 15° C. The solution was then heated on a steam bath and gelation occurred after about two minutes. The gel was dried for 24 hours at 65° C. and then for 24 hours at 100° C. after which it was crushed, regenerated and washed. The yield was 27 parts of resin having an acid removal capacity of 536 me./l.

In carrying out the process of this invention, the anion exchange resin may be produced by forming separate solutions of each of the constituents (i. e. a polyalkylene polyamine, an aldehyde and an organic compound having at least two labile methylol-forming hydrogen atoms)

and mixing the solutions sufficiently slowly to control the temperature of the mixture and retard gel formation.

*Example XII.*—Three different samples of resin of ½–1 inch size were placed in water at 25° C., 50° C., and 100° C., and kept at these temperatures, respectively, for 24 hours. The products were then dried and screened. Screen analyses of these three products are given in the following table.

Table I

| Decrepitation Temperature, ° C. | Percentage on screen of indicated mesh size | | | | | | | | |
|---|---|---|---|---|---|---|---|---|---|
| | 8 | 10 | 16 | 20 | 30 | 40 | 50 | 60 | Fines |
| 25 | 3 | 3 | 39 | 22 | 27 | 4 | | 1 | 1 |
| 50 | 23 | 7 | 36 | 9 | 19 | 3 | 1 | 1 | 1 |
| 100 | 82 | 6 | 8 | 1 | 2 | 1 | | | |

*Example XIII.*—A sample of dry resin was divided into three portions. The first was screen analyzed. The second was exposed to steam for 15 minutes, placed in water for several hours, dried, and screen analyzed. The third was placed in water directly and allowed to remain for several hours, dried, and screen analyzed. Screen analyses of the three products are given in the following table.

Table II

| Sample | Percentage on screen of indicated mesh size | | | | | | | | |
|---|---|---|---|---|---|---|---|---|---|
| | 8 | 10 | 16 | 20 | 30 | 40 | 50 | 60 | Fines |
| Untreated resin | 1 | 2 | 33 | 24 | 29 | 8 | 1 | 1 | 1 |
| Steamed and wetted resin | 1 | 2 | 26 | 24 | 34 | 10 | 1 | 1 | 1 |
| Wetted resin | | | 3 | 17 | 49 | 24 | 5 | 1 | 1 |

The resins produced according to this invention are well adapted for the treatment of liquids to effect anion exchange reactions. Although the products may be used in powdered or lump form, they are preferably granulated to about 10 to 40 mesh and used in the form of a pervious bed supported in a suitable tank or other vessel by a screen and layer of gravel or similar inert material.

Liquid to be treated such as water containing an acid is percolated through this bed between regenerations, and the bed is regenerated when necessary by flushing it with an alkaline solution. A sodium carbonate solution is well suited for use as a regenerant.

These anion exchangers remove anions from the liquid being treated giving up hydroxyl ions to the liquid in exchange therefor. When the liquid treated contains an acid, therefore, the net result is the removal of acid from the liquid. During regeneration, of course, the anions held by the exchanger are liberated and washed away, and the hydroxyl ion content of the exchanger is restored simultaneously.

By the term "anion exchanger" or "anion exchange resin" as used herein, is meant a material substantially insoluble in dilute acids and dilute alkalies but capable of removing acids from aqueous solutions thereof, and capable of being regenerated with an alkaline solution to restore the acid-removing ability of the material.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A process of preparing an anion exchange resin substantially insoluble in water, dilute acids and dilute alkalies comprising forming an alkaline condensed gel by reacting 0.7 to 5 mols of a free polyethylene polyamine, 2.5 to 6.6 mols of an aldehyde selected from the class consisting of formaldehyde, furfural and glucose and one mol of an organic compound selected from the class consisting of ketones and aldehydes, each member of said class having at least two methylol-forming hydrogen atoms.

2. A process of preparing an anion exchange resin substantially insoluble in water, dilute acids and dilute alkalies comprising reacting in solution until an alkaline condensed gel is formed, 0.7 to 5 mols of a free polyethylene polyamine, 2.5 to 6 mols of formaldehyde and one mol of an organic compound selected from the class consisting of ketones and aldehydes, each member of said class having at least two methylol-forming hydrogen atoms.

3. A process of preparing an anion exchange resin substantially insoluble in water, dilute acids and dilute alkalies comprising mixing together in solution, under alkaline conditions, 0.7 to 5 mols of a free polyethylene polyamine containing at least four nitrogen atoms, 2.5 to 6 mols of formaldehyde and one mol of an organic compound selected from the class consisting of ketones and aldehydes, each member of said class having at least two methylol-forming hydrogen atoms.

4. A process of preparing an anion exchange resin substantially insoluble in water, dilute acids and dilute alkalies in which a free polyethylene polyamine is reacted with formaldehyde and an organic compound selected from the class consisting of ketones and aldehydes, each member of said class having at least two methylol-forming hydrogen atoms, said process comprising reacting 2.5 to 6 mols of formaldehyde and one mol of said organic compound under alkaline conditions to effect a condensation thereof and adding thereto 0.7 to 5 mols of the free polyethylene polyamine.

5. In a process of preparing an anion exchange resin substantially insoluble in water, dilute acids and dilute alkalies, the steps of condensing 2.5 to 6 mols of formaldehyde and one mol of a ketone having at least two methylol-forming hydrogen atoms with an alkaline catalyst, mixing the reaction mixture with 0.7 to 5 mols of a polyethylene polyamine to form a gel and drying the gel thus obtained.

6. A process of preparing an anion exchange resin substantially insoluble in water, dilute acids and dilute alkalies comprising forming an alkaline condensed gel by reacting 0.7 to 5 mols of a free polyethylene polyamine, 2.5 to 6 mols of formaldehyde and one mol of acetone.

7. In a process of preparing an anion exchange resin substantially insoluble in water, dilute acids and dilute alkalies and produced by reacting 0.7 to 5 mols of a free polyethylene polyamine, 2.5 to 6.6 mols of an aldehyde selected from the class consisting of formaldehyde, furfural and glucose and one mol of an organic compound selected from the class consisting of ketones and aldehydes, each member of said class having at least two methylol-forming hydrogen atoms, the steps of forming an alkaline condensed gel, drying said gel at a temperature below 100° C. and thereafter heating the dried gel at a temperature substantially above 100° C.

8. In a process of preparing an anion exchange resin substantially insoluble in water, dilute acids and dilute alkalies and produced by reacting 0.7 to 5 mols of a free polyethylene polyamine, 2.5 to 6.6 mols of an aldehyde selected from the class consisting of formaldehyde, furfural and glucose and one mol of an organic compound selected from the class consisting of ketones and aldehydes, each member of said class having at least two methylol-forming hydrogen atoms, the steps of forming an alkaline condensed gel, drying said gel and subjecting the dried product to decrepitation under controlled conditions to regulate the size of the particles obtained, the temperature of the water being higher for production of larger particles.

9. In a process of preparing an anion exchange resin substantially insoluble in water, dilute acids and dilute alkalies and produced by reacting 0.7 to 5 mols of a fres polyethylene polyamine, 2.5 to 6.6 mols of an aldehyde selected from the class consisting of formaldehyde, furfural and glucose and one mol of an organic compound selected from the class consisting of ketones and aldehydes, each member of said class having at least two methylol-forming hydrogen atoms, the steps of forming an alkaline condensed gel, drying said gel and treating the dried product with steam to minimize decrepitation when it is subsequently placed in water.

10. A process of treating an aqueous solution to effect an exchange of anions comprising contacting said solution with an anion exchange resin substantially insoluble in water, dilute acids and dilute alkalies and prepared by alkaline condensation of 0.7 to 5 mols of a free polyethylene polyamine with 2.5 to 6.6 mols of an aldehyde selected from the class consisting of formaldehyde, furfural and glucose and one mol of an organic compound selected from the class consisting of ketones and aldehydes, each member of said class having at least two methylol-forming hydrogen atoms.

11. A process of treating an aqueous solution to effect an exchange of anions comprising contacting said solution with an anion exchange resin substantially insoluble in water, dilute acids and dilute alkalies and prepared by alkaline condensation of 0.7 to 5 mols of a polyethylene polyamine with a condensation product of 2.5 to 6 mols of formaldehyde and one mol of an organic compound selected from the class consisting of ketones and aldehydes, each member of said class having at least two methylol-forming hydrogen atoms.

12. In a regenerative process of removing acids from liquids in which an anion exchange product is regenerated periodically with an alkaline solution, the step of passing the liquid containing an acid into intimate contact with granules of an alkaline condensation product of 0.7 to 5 mols of a free polyethylene polyamine, 2.5 to 6 mols of formaldehyde and one mol of an organic compound selected from the class consisting of ketones and aldehydes, each member of said class having two methylol-forming hydrogen atoms, said granules having been dried first at a temperature below 100° C. and subsequently heated at a temperature of at least 100° C.

13. A process of treating an aqueous solution to effect an exchange of anions comprising contacting said solution with an anion exchange resin substantially insoluble in water, dilute acids and dilute alkalies and prepared by alkaline condensation of 0.7 to 5 mols of a free polyethylene polyamine with 2.5 to 6 mols of formaldehyde and one mol of acetone.

SIDNEY SUSSMAN.

REFERENCES CITED

The following references are of record in the file of this patent:

UNITED STATES PATENTS

| Number | Name | Date |
| --- | --- | --- |
| 2,198,874 | Holmes | Apr. 30, 1940 |
| 2,223,930 | Griessbach | Dec. 3, 1940 |
| 2,251,234 | Swain | July 29, 1941 |
| 2,259,169 | Little | Oct. 14, 1941 |
| 2,272,783 | Treboux | Feb. 10, 1942 |
| 2,276,309 | Hummel | Mar. 17, 1942 |
| 2,286,752 | Mighton | June 16, 1942 |
| 2,362,086 | Myers | Nov. 7, 1944 |

FOREIGN PATENTS

| Number | Country | Date |
| --- | --- | --- |
| 208,535 | Switzerland | May 1, 1940 |
| 466,346 | Great Britain | May 24, 1937 |